(12) United States Patent
Yoshitake et al.

(10) Patent No.: US 11,411,319 B2
(45) Date of Patent: Aug. 9, 2022

(54) ANTENNA APPARATUS

(71) Applicant: DENSO TEN Limited, Kobe (JP)

(72) Inventors: Hiroaki Yoshitake, Kobe (JP); Norihisa Nishimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 711 days.

(21) Appl. No.: 16/299,490

(22) Filed: Mar. 12, 2019

(65) Prior Publication Data

US 2019/0312357 A1  Oct. 10, 2019

(30) Foreign Application Priority Data

Apr. 4, 2018 (JP) .............................. JP2018-072710

(51) Int. Cl.
*H01Q 21/00* (2006.01)
*G01S 7/03* (2006.01)
*H01Q 1/38* (2006.01)

(52) U.S. Cl.
CPC ......... *H01Q 21/0037* (2013.01); *G01S 7/032* (2013.01); *H01Q 1/38* (2013.01)

(58) Field of Classification Search
CPC combination set(s) only.
See application file for complete search history.

(56) References Cited

U.S. PATENT DOCUMENTS

| 9,972,900 | B2* | 5/2018 | Okunaga | H01Q 21/0075 |
| 2006/0284777 | A1* | 12/2006 | Lee | H01Q 1/2208 |
| | | | | 343/767 |
| 2008/0284654 | A1* | 11/2008 | Burnside | G06K 7/0008 |
| | | | | 343/700 MS |
| 2010/0238067 | A1* | 9/2010 | Nakabayashi | H01Q 21/0075 |
| | | | | 342/70 |
| 2013/0027259 | A1* | 1/2013 | Fujita | H01Q 13/206 |
| | | | | 343/731 |
| 2016/0365640 | A1* | 12/2016 | Minard | H01Q 1/48 |
| 2020/0374378 | A1* | 11/2020 | Maatta | H01Q 9/42 |

FOREIGN PATENT DOCUMENTS

JP  2009-055414 A  3/2009

OTHER PUBLICATIONS

Sakakibara et al. "Two-Dimensional Array Design Techniques of Millimeter-Wave Microstrip Comb-Line Antenna Array." Radio Science. 2008. vol. 43, RS4S25. doi:10.1029/2007RS003801.

* cited by examiner

*Primary Examiner* — Junpeng Chen
(74) *Attorney, Agent, or Firm* — Oliff PLC

(57) ABSTRACT

An antenna apparatus according to an embodiment includes a linear feed line and a radiating element that protrudes laterally from a first side of the feed line. The radiating element is formed by a conductive pattern, and an opening pattern is located in a portion of the feed line from which the radiating element protrudes. The opening pattern extends into a portion of the radiating element.

14 Claims, 17 Drawing Sheets

ANTENNA APPARATUS

BACKGROUND OF THE INVENTION

Field of the Invention

The invention relates to an antenna apparatus.

Description of the Background Art

Conventionally, there has been an antenna apparatus that transmits and receives radio waves in a millimeter wave band and a microwave band. Such an antenna apparatus has been widely used, for example, in an on-vehicle radar apparatus, and the like. As for the antenna apparatus, a technology of connecting a line formed on a dielectric substrate, through which signals propagate, to a radiating element for transmitting and receiving radio waves has been known.

However, in the conventional technology, there has been a problem that signals are not sufficiently supplied from the line to the radiating element (or the radiating element to the line). For example, when electric power is not sufficiently supplied to the radiating element, a beam pattern of a radar apparatus, or the like, collapses, so that various antenna characteristics, such as a side lobe ratio and an antenna gain itself, may deteriorate.

SUMMARY OF THE INVENTION

According to one aspect of the invention, an antenna apparatus includes a linear feed line and a radiating element that protrudes laterally from a first side of the feed line. The radiating element is formed by a conductive pattern, and an opening pattern is located in a portion of the feed line from which the radiating element protrudes. The opening pattern extends into a portion of the radiating element.

Thus, it is possible to distribute a desired amount of electric power to the radiating element.

According to another aspect of the invention, the antenna apparatus further includes impedance matching elements that match an impedance of the radiating element. The impedance matching elements are located a predetermined distance away from the radiating element having the opening pattern. A plurality of the radiating elements is provided to the feed line at predetermined intervals, and the feed line is bent together with the impedance matching elements at a location that is between two of the radiating elements that are adjacent to each other.

Thus, a length of an antenna element in an extending direction can be shortened, so that an antenna apparatus can be downsized.

Therefore, an object of the invention is to provide an antenna apparatus that can distribute a desired amount of electric power to the radiating element.

These and other objects, features, aspects and advantages of the invention will become more apparent from the following detailed description of the invention when taken in conjunction with the accompanying drawings.

DESCRIPTION OF THE EMBODIMENTS

An embodiment of an antenna apparatus disclosed in the application will be hereinafter described in detail with reference to accompanying drawings. The invention is not limited to the embodiment. A case in which the antenna apparatus is a transmitting antenna that radiates radio waves outside will be hereinafter described, as an example, but the antenna apparatus may be a receiving antenna that receives radio waves.

Figure 1:
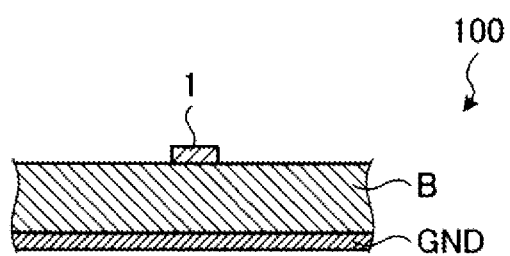
FIG. 1 illustrates a cross-sectional view of an antenna apparatus according to an embodiment.
Figure 2:
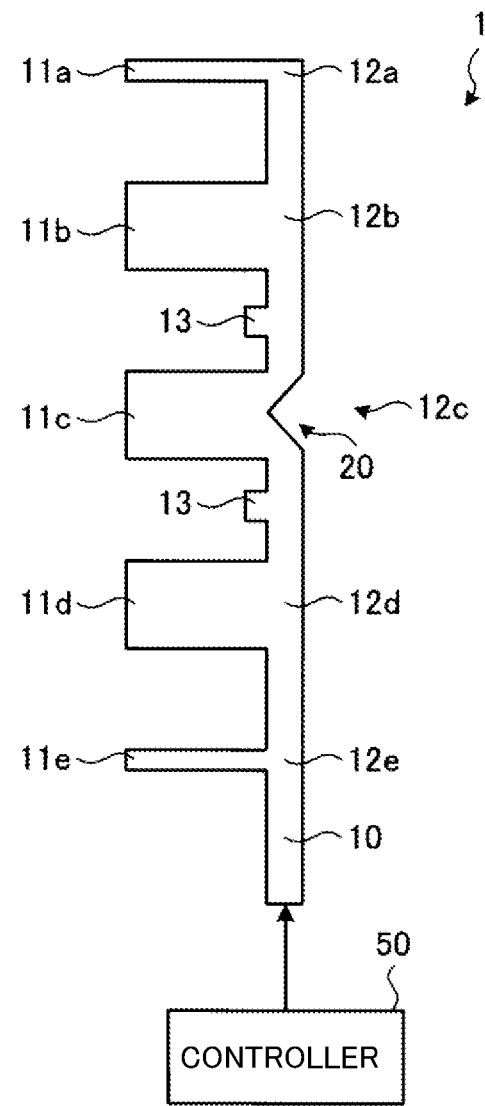
FIG. 2 illustrates a front view of an antenna element according to the embodiment.

First, description will be made on an outline of the antenna apparatus according to the embodiment with reference to FIG. 1 and FIG. 2. FIG. 1 illustrates a cross-sectional view of the antenna apparatus according to the embodiment. FIG. 2 illustrates a front view of an antenna element according to the embodiment. FIG. 2 illustrates a standing-wave excitation-type antenna element.

An antenna apparatus 100 is mounted on a radar apparatus that detects a target by transmitting and receiving radio waves having, for example, a Frequency Modulated Continuous Wave type (FM-CW type), a Fast-Chirp Modulation type (FCM type), or the like. An apparatus on which the antenna apparatus 100 is mounted is not limited to the radar apparatus, and the apparatus may be any electronic apparatus for transmitting and receiving radio waves. The antenna apparatus 100 may be an antenna apparatus that performs only one of transmission and reception of radio waves.

As illustrated in FIG. 1, the antenna apparatus 100 according to the embodiment includes a dielectric substrate B, a ground GND that is a conductive foil provided on a back side of the dielectric substrate B, and an antenna element 1 that is a linear conductive foil provided on a front side of the dielectric substrate B. The antenna apparatus 100 having such a configuration is also called a microstrip line antenna apparatus (microstrip antenna).

An example in FIG. 1 shows only one antenna element 1. However, in fact, the antenna apparatus 100 is an array antenna that has a plurality of the antenna elements 1. A number of the antenna elements 1 may be arbitrary.

As illustrated in FIG. 2, the antenna element 1 includes a linear feed line 10, a radiating element 11a to a radiating element 11e (hereinafter, may be referred to as a radiating element 11), and impedance matching elements 13. For example, the feed line 10, the radiating element 11 and the impedance matching elements 13 are integrally formed from the conductive foil as a pattern on the dielectric substrate B. In the antenna apparatus 100 that is the array antenna, the plurality of the antenna elements 1 is arranged in a direction (left-right direction on a paper surface) perpendicular to an extending direction (up-down direction on the paper surface) of the antenna element 1.

The feed line 10 propagates a signal (i.e., the signal that is supplied from a controller 50 in a form of high frequency electric power) that is supplied from the controller 50, such as the radar apparatus, to each radiating element 11. For example, when the antenna element 1 functions as the receiving antenna, the feed line 10 propagates the signal received by the radiating element 11 to the controller 50.

The radiating elements to 11a to 11e are connected to the feed line 10 in a connector 12a to a connector 12e (hereinafter, may be referred to as a connector 12), respectively. In this embodiment, the radiating elements 11a to 11e and the feed line 10 are arranged so that one side of each of the radiating elements 11a to 11e exists on the same straight line with respect to an extending direction (up-down direction on the paper surface) of the feed line 10. Therefore, the radiating element 11 has a shape in which the radiating element 11 protrudes from the feed line 10. A plurality of the radiating elements 11a to 11e is provided at predetermined intervals along the extending direction of the feed line 10. For example, a distance between each of the plurality of the radiating elements 11a to 11e is 1 λg when a wavelength of the signal that propagates through the feed line 10 is λg.

In an example shown in FIG. 2, in the terminating radiating element 11a, the signal that is supplied from the controller 50 is partially radiated from the radiating element 11a as radio waves and is partially reflected to a side of the controller 50. That is, in the example shown in FIG. 2, standing waves obtained by combining a signal traveling from the controller 50 to the terminating radiating element 11a and a signal reflected from the terminating radiating element 11a are formed in the feed line 10. The antenna element 1 having such a configuration is also called the standing-wave excitation-type antenna element.

The antenna element 1 may be a traveling-wave excitation-type antenna element in which the terminating radiating element 11a is a matching element, but a traveling-wave excitation-type antenna element 1 will be described later in FIG. 13.

As illustrated in FIG. 2, as for the plurality of the radiating elements 11a to 11e, an element width of each of the center radiating elements 11b to 11d is wider than the element width of each of the terminating radiating element 11a and the base-end radiating element 11e. In other words, an amount of electric power to be distributed to each of the center radiating elements 11b to 11d is larger than the amount of electric power to be distributed to each of the terminating radiating element 11a and the base-end radiating element 11e. A ratio of electric power to be distributed to the radiating element 11 is also called a coupling amount of the radiating element 11. The coupling amount is represented by "coupling amount K=1−S11²−S21²" by using an S parameter of the connector 12 when viewed from an input side. That is, this means that the coupling amount K is obtained by subtracting a signal (S11²) that is reflected from the connector 12 and a signal (S21²) that penetrates through the connector 12 from an input supplied signal (1).

In a conventional antenna element, control of the coupling amount is performed by changing the element width. However, there has been a problem that even if the element width is increased, the amount of electric power to be distributed to a side of the radiating element cannot be sufficiently secured, that is, in some cases, the coupling amount does not become large. In other words, since the conventional antenna element has a structure in which signals propagating through the feed line does not easily flow to the side of the radiating element in the connector between the feed line and the radiating element, the coupling amount is not easily increased. When the amount of electric power that is supplied to the radiating element is not sufficient, a beam pattern of the antenna collapses, so that various antenna characteristics, such as a side lobe ratio and an antenna gain itself, may deteriorate.

Therefore, the antenna element 1 of the antenna apparatus 100 according to the embodiment has an opening pattern 20 (also referred to as "aperture") in a range in which the feed line 10 extends to an inside of the radiating element 11. In the example shown in FIG. 2, in the center-positioned radiating element 11c; an opening is provided in a direction in which the radiating element 11c protrudes from the feed line 10 so as to form the opening pattern 20. The opening pattern 20 has a notch shape which is formed in the direction in which the radiating element 11c protrudes from the feed line 10. As a result, a traveling direction of the signals propagating through the feed line 10 is partially directed to a side of the radiating element 11c by the opening pattern 20.

In other words, a line structure of the feed line 10 extending from the controller 50 to the terminating radiating element 11a becomes discontinuous by the opening pattern 20 existing in the range in which the feed line 10 extends. As a result, travel of the signals propagating through the feed line 10 is prevented, so that the signals are propagated to the side of the radiating element 11c easily.

In the standing-wave excitation-type antenna element 1 shown in FIG. 2, the traveling direction of the signals that are reflected from the terminating radiating element 11a and returns to the side of the controller 50 is also partially directed to the side of the radiating element 11c by the opening pattern 20.

As described above, in the antenna apparatus 100 according to the embodiment, by providing the opening pattern 20, electric power can easily flow from the feed line 10 to the side of the radiating element 11c. That is, the coupling amount of the radiating element 11 can be increased. Therefore, in the antenna apparatus 100 according to the embodiment, it is possible to distribute a desired amount of electric power to the radiating element 11.

As illustrated in FIG. 2, in the antenna element 1, the impedance matching elements 13 can suppress reflection of the signals caused by a change in an impedance of the feed line 10 in the connector 12 including the opening pattern 20. This is described later in FIG. 9 and FIG. 10.

Figure 3:
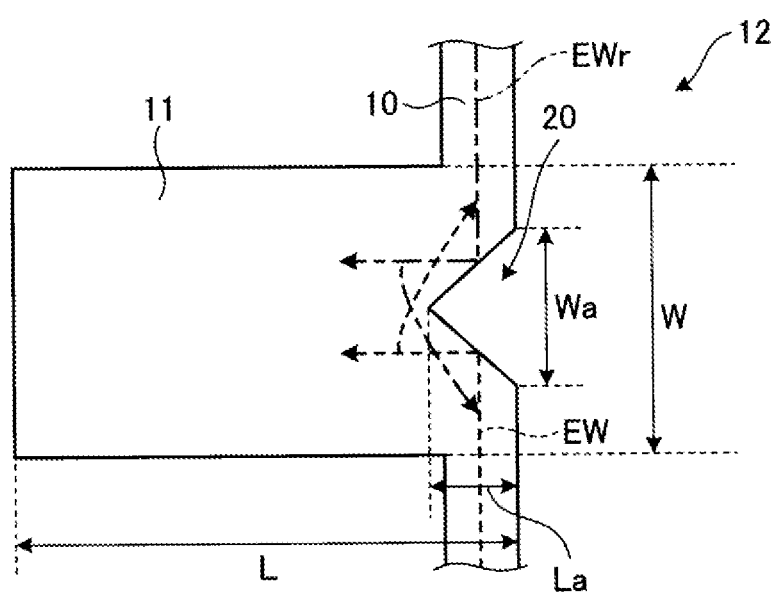
FIG. 3 is a diagram illustrating an opening pattern according to the embodiment.
Figure 4:
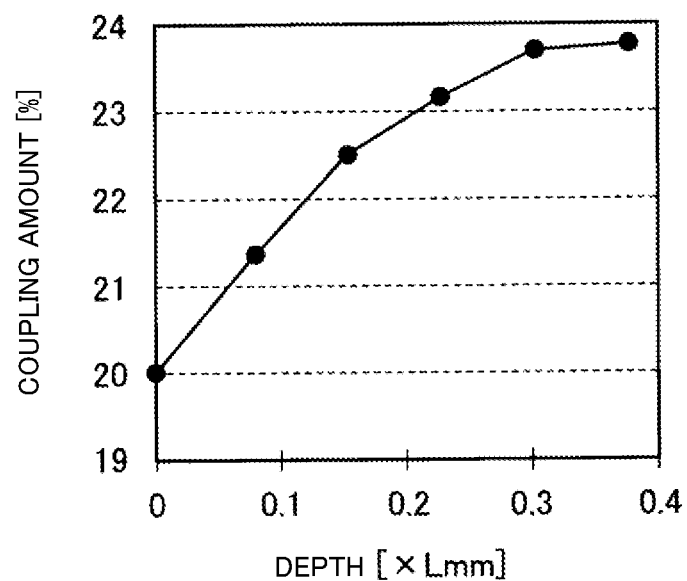
FIG. 4 is a diagram illustrating a relation between an opening depth of the opening pattern and a coupling amount.
Figure 5:
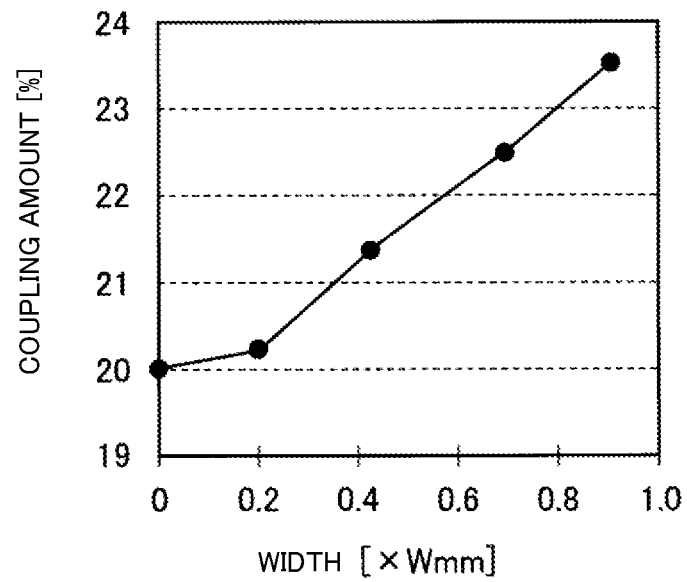
FIG. 5 is a diagram illustrating a relation between an opening width of the opening pattern and the coupling amount.

Next, the opening pattern 20 will be described in detail with reference to FIG. 3 to FIG. 5. FIG. 3 is a diagram illustrating the opening pattern 20 according to the embodiment. FIG. 4 is a diagram illustrating a relation between an opening depth of the opening pattern 20 and the coupling amount. FIG. 5 is a diagram illustrating a relation between an opening width of the opening pattern 20 and the coupling amount.

In FIG. 3, the element width of the radiating element 11 is expressed by W (hereinafter, referred to as "element width W"), an element length from a distal end of the radiating element 11 to a side (side opposite to the radiating element 11) of the feed line 10 is expressed by L (hereinafter, referred to as "element length L").

As illustrated in FIG. 3, it is preferable that the opening pattern 20 be formed into, for example, a triangular shape. Thus, since a number of vertices of the opening pattern 20 is one, it is possible to facilitate a manufacturing process.

More preferably, as illustrated in FIG. 3, the opening pattern 20 is an isosceles triangle having a vertex on the side of the radiating element 11 when the antenna element 1 is the standing-wave excitation-type antenna element. That is, it is preferable that the opening pattern 20 be line symmetrical with respect to the extending direction of the feed line 10. As a result, a signal EW from the side of the controller 50 and a signal EWr reflected from the terminating radiating element 11a can be evenly distributed to the side of the radiating element 11.

Moreover, as illustrated in FIG. 3, the opening pattern 20 has an opening depth La that is a length in a direction from the feed line 10 to the radiating element 11 and an opening width Wa that is a length in the extending direction of the feed line 10. The coupling amount can be adjusted by adjusting the opening depth La and the opening width Wa.

In FIG. 4, a horizontal axis indicates a ratio of the opening depth La to the element length L and a vertical axis indicates the coupling amount. In FIG. 5, a horizontal axis indicates a ratio of the opening width Wa to the element width W and a vertical axis indicates the coupling amount.

FIG. 4 and FIG. 5 show simulation results of the coupling amount obtained when the impedance matching elements 13 are not provided on both side of the radiating element 11. Simulation results of the coupling amount obtained when the impedance matching elements 13 are provided on both sides of the radiating element 11 are described later in FIG. 10.

In a graph shown in FIG. 4, when the ratio of the opening depth La to the element length L is 0, that is, when the opening pattern 20 is not provided in the antenna element 1, the coupling amount is the lowest at about 20%. On the other hand, when the ratio of the opening depth La to the element length L is about 0.4, the coupling amount is the highest with a little less than 24%. That is, as the opening depth La of the opening pattern 20 is deeper, the coupling amount increases.

In a graph shown in FIG. 5, when the ratio of the opening width Wa to the element width W is 0, that is, when the opening pattern 20 is not provided in the antenna element 1, the coupling amount is the lowest at about 20%. On the other hand, when the ratio of the opening width Wa to the element width W is 0.9, that is, when the opening pattern 20 is formed throughout the element width W of the radiating element 11, the coupling amount is the highest at about 23.5%. That is, as the opening width Wa of the opening pattern 20 is wider, the coupling amount increases.

As described above, by adjusting the opening depth La and the opening width Wa of the opening pattern 20, it is possible to set the coupling amount to any value within a certain range.

In the above, a case in which the coupling amount can be adjusted by adjusting the opening depth La and the opening width Wa of the opening pattern 20 is shown, but, for example, an angle of the vertex (vertex angle of the isosceles triangle) in the opening pattern 20 on the side of the radiating element 11 may be adjusted to adjust the coupling amount.

In FIG. 3 to FIG. 5, a case of the opening pattern 20 having a triangular shape is described as one example, but may be, for example, the opening pattern 20 may have a polygonal shape having four or more angles. Here, a case of the opening pattern 20 having a quadrangular shape will be described with reference to FIG. 6A to FIG. 6C, FIG. 7 and FIG. 8.

Figure 6A:
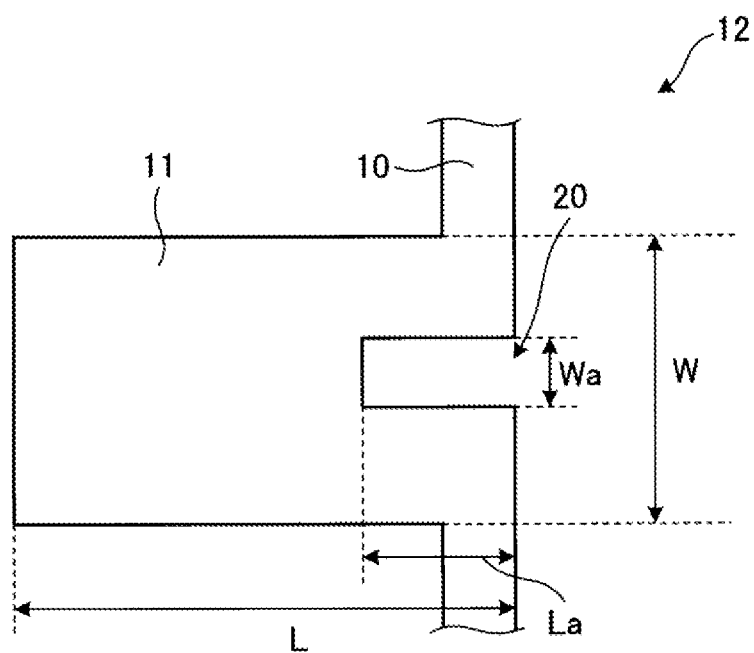
FIG. 6A is a diagram illustrating an opening pattern according to a modification.
Figure 7:
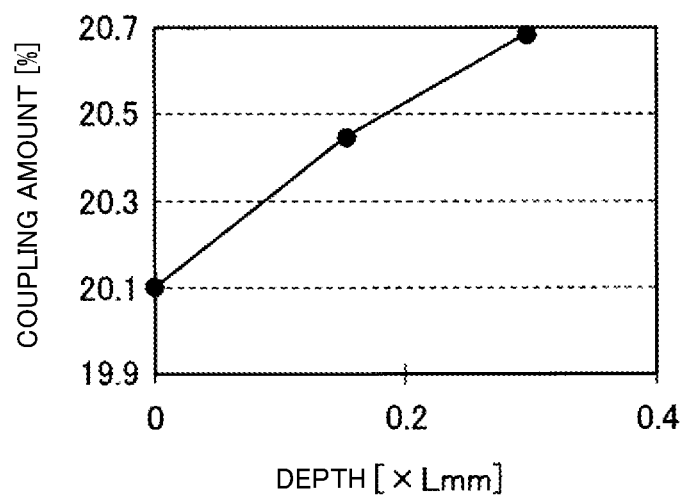
FIG. 7 is a diagram illustrating a relation between an opening depth of the opening pattern according to the modification and a coupling amount.
Figure 8:
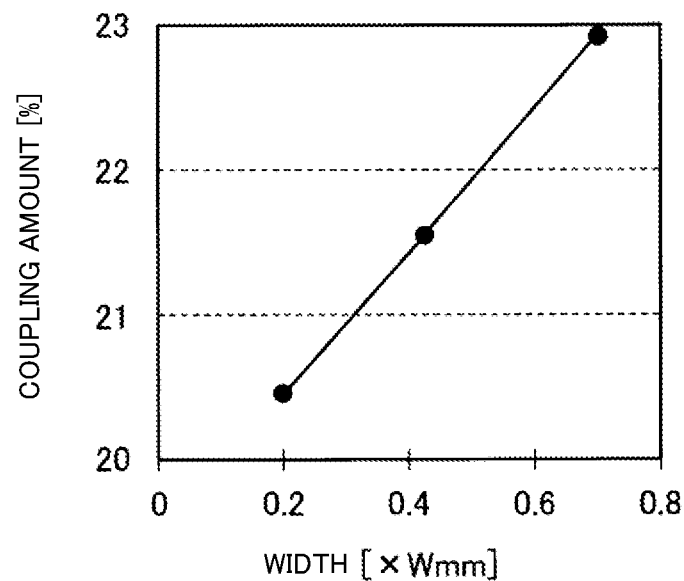
FIG. 8 is a diagram illustrating a relation between an opening width of the opening pattern according to the modification and the coupling amount.

FIG. 6A is a diagram illustrating an opening pattern 20 according to a modification. FIG. 7 is a diagram illustrating a relation between an opening depth of the opening pattern 20 according to the modification and a coupling amount. FIG. 8 is a diagram illustrating a relation between an opening width of the opening pattern 20 according to the modification and the coupling amount.

As illustrated in FIG. 6A, it is preferable that the opening pattern 20 have a rectangular shape having a side parallel to a protrusion direction of a radiating element 11. Specifically, when the protrusion direction of the radiating element 11 is perpendicular to an extending direction of a feed line 10, it is preferable that the opening pattern 20 have a rectangular shape having two sides parallel to the perpendicular direction. Thus, since it is possible to certainly change directions of signals propagating through the feed line 10, the coupling amount can be increased.

Specifically, as illustrated in FIG. 7, a ratio of an opening depth La to an element length L is 0, the coupling amount is the lowest at about 20%. When the ratio of the opening depth La to the element length L is 0.3, the coupling amount is the highest at 20.7%. That is, as the opening depth La of the opening pattern 20 having a rectangular shape is deeper, the coupling amount increases.

As illustrated in FIG. 8, a ratio of an opening width Wa to an element width is 0.2, the coupling amount is the lowest at 20.5%. The ratio of the opening width Wa to the element width is 0.7, the coupling amount is the highest at about 23%. That is, as the opening width Wa of the opening pattern 20 having a rectangular shape is wider, the coupling amount increases.

In FIG. 6A, the opening pattern 20 having a rectangular shape is shown as one example of the opening pattern 20 having a quadrangular shape, but, for example, the opening pattern 20 may have a trapezoidal shape. Specifically, the opening pattern 20 may have a trapezoidal shape in which two legs extend outward from an upper base on a side of the radiating element 11 to a lower base.

Figure 6B:
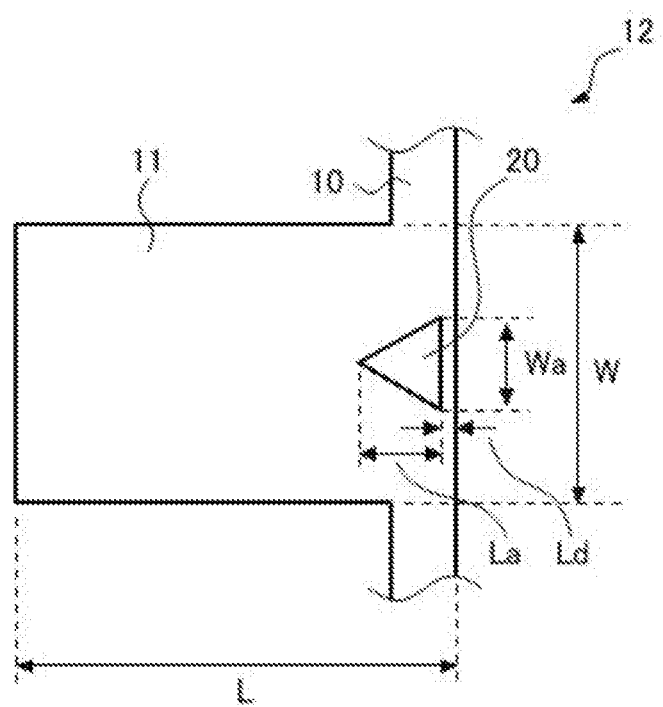
FIG. 6B is a diagram illustrating an opening pattern according to a modification.

FIG. 6B is a diagram illustrating an opening pattern 20 according to a modification. The opening pattern 20 shown in FIG. 6B has a triangular opening like the opening pattern heretofore described. However, a side (side opposite to the radiating element 11) of the feed line 10 is not cut out. That is, in a range in which the feed line 10 extends to an inside of the radiating element 11, the opening pattern 20 is formed as a pattern in which a conductive film is removed in a triangular shape. The opening pattern 20 is formed by removing the conductive film in a triangular shape having a width Wa and a height La at a distance Ld away from the side (side opposite to the radiating element 11) of the feed line 10. In FIG. 6B, the opening pattern 20 has a triangular shape, but may have a rectangular shape as shown in FIG. 6A, or may have a polygonal shape having four or more angles.

Figure 6C:
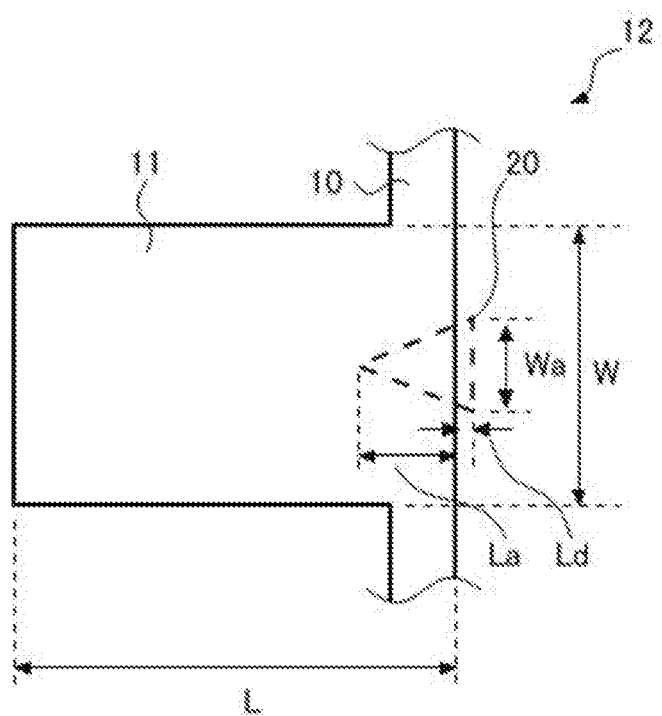
FIG. 6C is a diagram illustrating an opening pattern according to a modification.

FIG. 6C is a diagram illustrating an opening pattern 20 according to a modification. The opening pattern 20 shown in FIG. 6C has a triangular opening like the opening pattern heretofore described. However, in the above description, the opening is provided on an antenna pattern side in a conductor constituting the radiating element 11, but in FIG. 6C, the opening pattern 20 is formed as a pattern in which a conductive film on a ground pattern side is removed in a triangular shape. The opening pattern 20 is formed by removing the conductive film in a triangular shape having a width Wa and a height La+Ld at a distance Ld away from the side (side opposite to the radiating element 11) of the feed line 10 in a ground pattern opposite to the radiating element 11. Also in this modification, the shape that is removed may be a rectangular shape as shown in FIG. 6A. In FIG. 6C, the opening pattern 20 is formed on the ground pattern side, but may be formed both on the ground pattern side and the antenna pattern side.

A size of the opening pattern 20 has dependency on a frequency of a supplied signal. In order to obtain the same coupling amount, as the frequency is higher, the size of the opening pattern 20 needs to be reduced. At this time, it is desirable to reduce the width Wa of the size.

Figure 9:
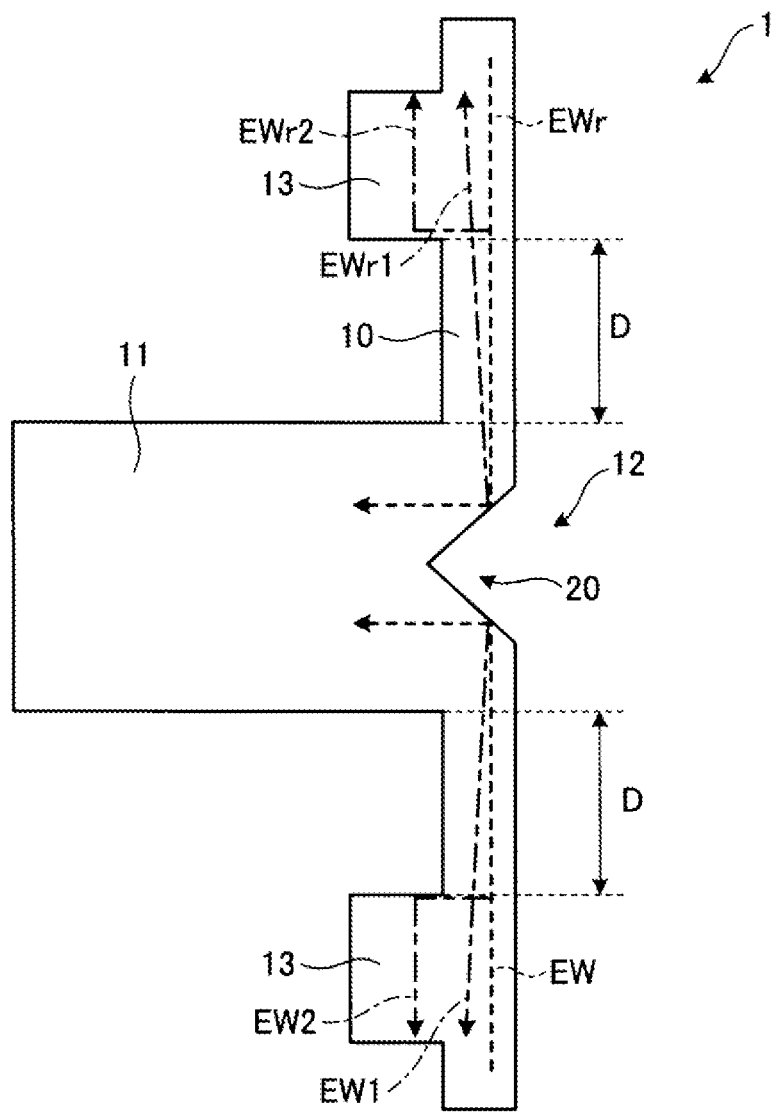
FIG. 9 is a diagram illustrating an antenna element including impedance matching elements.
Figure 10:
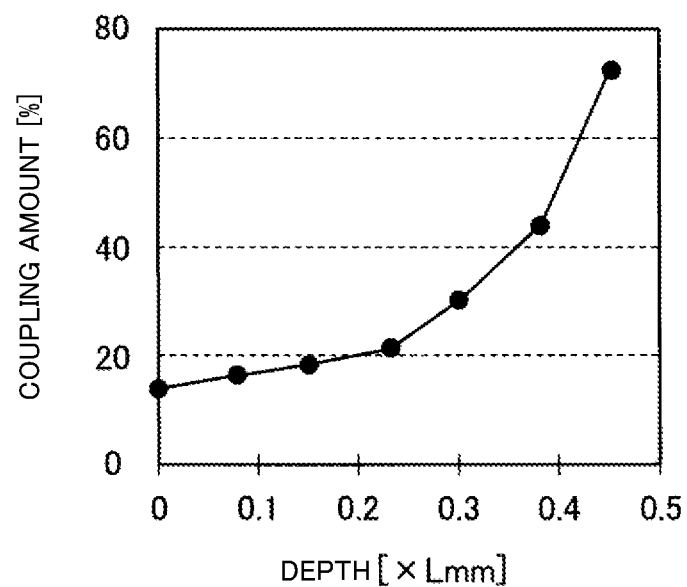
FIG. 10 is a diagram illustrating a relation between an opening depth of an opening pattern and a coupling amount.

Impedance matching elements 13 will be described in detail with reference to FIG. 9 and FIG. 10. FIG. 9 is a diagram illustrating an antenna element 1 including the impedance matching elements 13. FIG. 10 is a diagram illustrating a relation between an opening depth of an opening pattern 20 and a coupling amount.

A feed line 10 has the impedance matching elements 13 for matching an impedance of a radiating element 11 in a position a predetermined distance D away from a connector 12 having the opening pattern 20. Such impedance matching elements 13 are formed as a distribution constant line that is connected in parallel to the feed line 10. For example, in a case of a standing-wave excitation-type antenna element 1, the impedance matching elements 13 are formed as so-called stubs that protrude in the same direction as the protrusion direction of the radiating element 11 on both sides of the radiating element 11.

The predetermined distance D is a distance in which signals EW1 and EWr1 (i.e., signals EW and EWr that are reflected from the connector 12 including the opening pattern 20 and return to a side of the feed line 10) have opposite phases to signals EW2 and EWr2 (i.e., the signals EW1 and EWr1 that are reflected from the impedance matching elements 13). In this case, there are many cases in which the signals EW1 and EWr1 contain the strongest reflected component from the opening pattern 20. Therefore, preferably, reflected signals from the opening pattern 20 may be set to have opposite phases.

That is, two signals EW1 and EW2 (or the signals EWr1 and EWr2) which have opposite phases cancel each other out. In this way, the signal EW1 (signal EWr1) caused by being reflected from the opening pattern 20 is cancelled out, so that it is possible to prevent the signals EW and EWr propagating to the radiating element 11 from being suppressed. Furthermore, in the standing-wave excitation-type antenna element 1, by providing the impedance matching elements 13 on both sides of the radiating element 11, it is possible to distribute more electric power to the radiating element 11.

Specifically, as illustrated in FIG. 10, when the ratio of the opening depth La to the element length L is 0.45, the coupling amount significantly increases to 70%, while when the ratio of the opening depth La to the element length L is 0, the coupling amount is less than 20%. That is, by providing the impedance matching elements 13, it is possible to dramatically increase the coupling amount by the opening pattern 20.

In FIG. 9, a case in which the impedance matching elements 13 protrude in the same direction as the protrusion direction of the radiating element 11 is shown, but the impedance matching elements 13 may protrude in a direction opposite to the protrusion direction of the radiating element 11.

A shape of the impedance matching elements 13 is not limited to a protrusion shape, and for example, may be a recessed shape that narrows a line width of the feed line 10. In other words, the impedance matching elements 13 may have any shape as long as the impedance matching elements 13 can make the line width of the feed line 10 discontinuous. Furthermore, the impedance Matching elements 13 may be formed so that a characteristic impedance of the feed line 10 changes.

Figure 11:
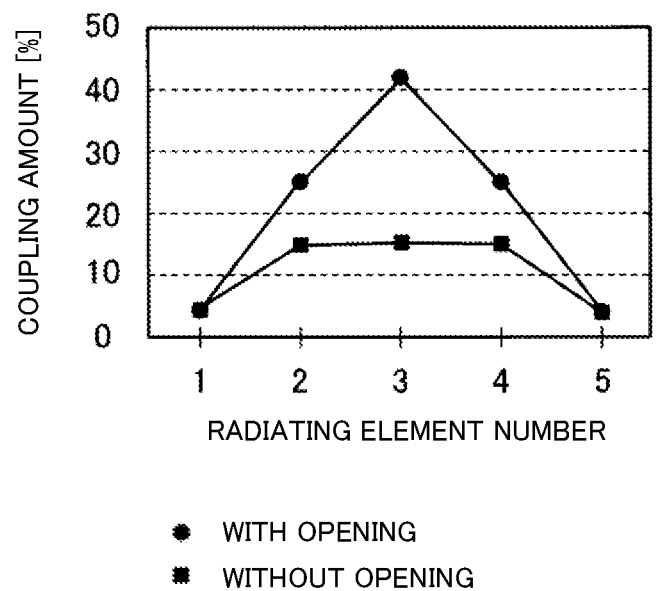
FIG. 11 is a diagram illustrating the coupling amount of each radiating element.

Next, the coupling amount of each of five radiating elements 11a to 11e in the antenna element 1 will be described with reference to FIG. 11. FIG. 11 is a diagram illustrating the coupling amount of each radiating element. In FIG. 11, a vertical axis indicates the coupling amount and a horizontal axis indicates the radiating element 11. A number "1" on the horizontal axis represents the base-end radiating element 11e, and a number "5" on the horizontal axis represents the terminating radiating element 11a. FIG. 11 shows the coupling amount obtained in the case where there is the opening pattern 20 in the connector 12 and the coupling amount obtained in the case Where there is no opening pattern 20 in the connector 12.

As illustrated in FIG. 11, in the standing-wave excitation-type antenna element 1, when there is the opening pattern 20 in the connector 12, the coupling amount of the center radiating element 11c (a number "3" shown in FIG. 11) can be drastically increased to about 42% while when there is no opening pattern 20 in the connector 12, the coupling amount of the center radiating element 11c is about 1.5%.

By providing the radiating elements 11b and 11d existing on both sides of the radiating element 11c (numbers "2" and "4" shown in FIG. 11) with the opening pattern 20 similarly, the coupling amount can be increased to about 25%. In this way, by providing the opening pattern 20, it is possible to realize an ideal distribution of the coupling amount of each of the five radiating elements 11a to 11e. That is, it is possible to realize a low side lobe of a vertical beam pattern that is radiated from the antenna apparatus 100.

As described above, the antenna apparatus 100 according to the embodiment includes the linear feed line 10 and the connector 12 including the radiating element 11 that protrudes from the feed line 10. The antenna apparatus 100 according to the embodiment includes the opening pattern 20 in the range in which the feed line 10 extends to the inside of the radiating element 11. Thus, it is possible to distribute the desired amount of electric power to the radiating element 11.

Figure 12:
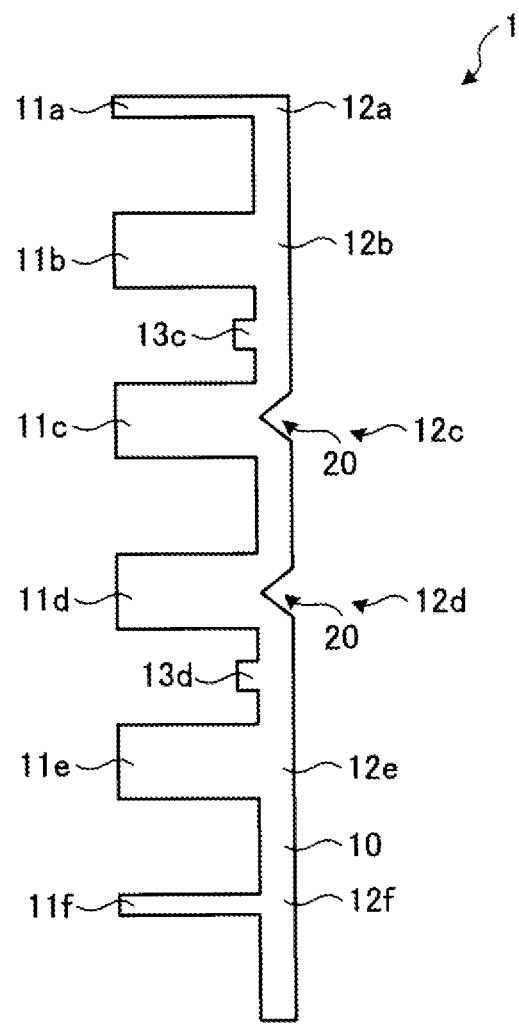
FIG. 12 is a diagram illustrating an antenna element according to a modification.

In the above described embodiment, a case in which the antenna element 1 includes five radiating elements 11a to 11e (refer to FIG. 2), that is, a number of the radiating elements 11 is an odd number is described, but as illustrated in FIG. 12, the number of the radiating elements 11 may be an even number.

FIG. 12 is a diagram illustrating an antenna element 1 according to a modification. FIG. 12 shows a case in which the antenna element 1 includes six radiating elements 11a to 11f. As illustrated in FIG. 12, opening patterns 20 are respectively formed in connectors 12c and 12d corresponding to two radiating elements 11c and 11d positioned at a center among the six radiating elements 11a to 11f.

An impedance matching element 13c is provided between the radiating elements 11b and 11c and an impedance matching element 13d is provided between the radiating elements 11d and 11e. The impedance matching element 13c is provided so that signals that are reflected from the terminating radiating element 11a cancel out signals that are reflected from the opening patterns 20 in the connectors 12c and 12d and return to the terminating radiating element 11a.

The impedance matching element 13d is provided so that signals that are supplied from the controller 50 (refer to FIG. 2) cancel out signals that are reflected from the opening patterns 20 in the connectors 12c and 12d and return to a side of the controller 50.

That is, when the two radiating elements 11c and 11d corresponding to the opening patterns 20 are deemed to be a single radiating element 11, it can be said that the impedance matching elements 13c and 13d are provided on both sides of the single radiating element 11. By arranging the opening patterns 20 and the impedance matching elements 13 in this manner, it is possible to equalize a ratio of electric power to be distributed to the radiating elements 11c and 11d.

That is, it is possible to prevent deformation of the vertical beam pattern due to the ratio of electric power that is distributed to two-center positioned radiating elements 11c and 11d being different, so that it is possible to form an optimal shape of the vertical beam pattern.

Figure 13:
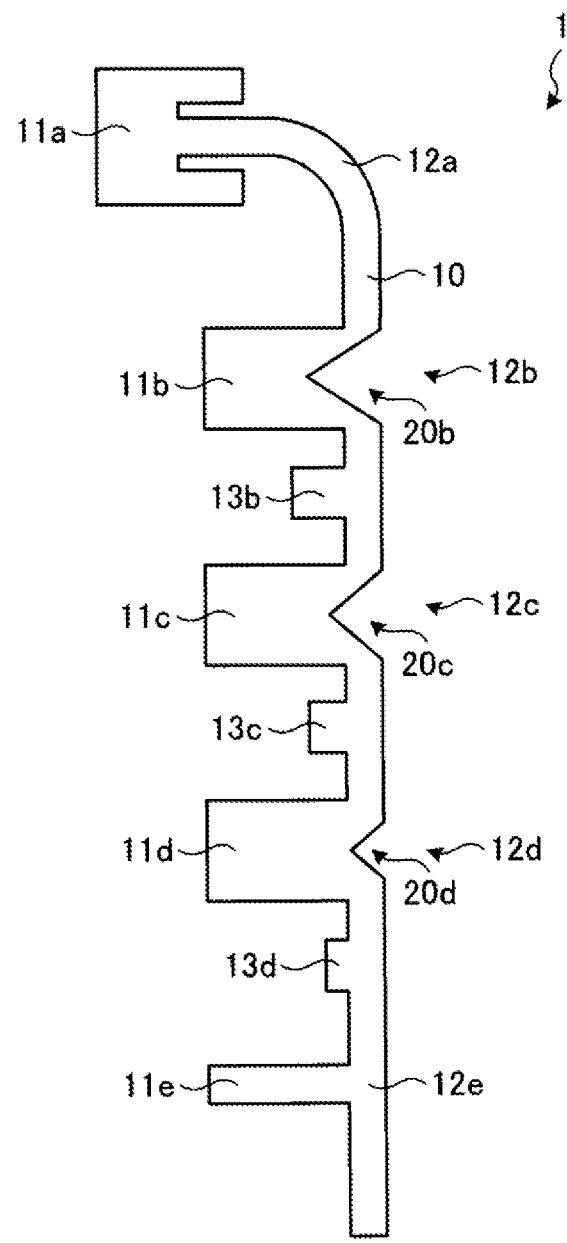
FIG. 13 is a diagram illustrating an antenna element according to a modification.

In the above, a case in which the antenna element 1 is the standing-wave excitation-type antenna element in which standing waves are formed is described as an example, but as illustrated in FIG. 13, the antenna element 1 may be a traveling-wave excitation-type antenna element that propagates traveling waves.

Figure 14:
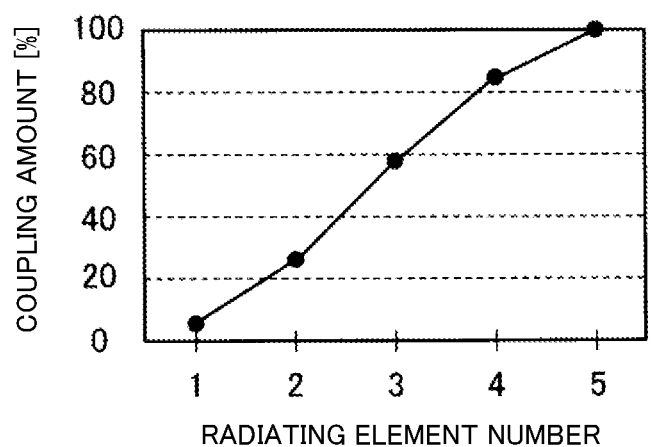
FIG. 14 is a diagram illustrating the coupling amount of each radiating element of the antenna element according to the modification.

FIG. 13 is a diagram illustrating an antenna element 1 according to a modification. FIG. 14 is a diagram illustrating the coupling amount of each radiating element of the antenna element 1 according to the modification. As illustrated in FIG. 13, the traveling-wave excitation-type antenna element 1 is different to the standing-wave excitation-type antenna element 1 in that the terminating radiating element 11a functions as a matching element.

Specifically, a terminating radiating element 11a in the traveling-wave excitation-type antenna element 1 radiates all radio waves supplied from the controller 50 outside. That is, the radio waves are not reflected from the terminating radiating element 11a to the side of the controller 50, so that the radio waves do not become standing waves but traveling waves.

As illustrated in FIG. 13, in the traveling-wave excitation-type antenna element 1, opening patterns 20b to 20d (hereinafter, may be referred to as an opening patter 20) are provided in connectors 12b to 12d, respectively, excluding a terminating connector 12a and a base-end connector 12e.

The respective opening patterns 20b to 20d have opening depths La and opening widths Wa which increase toward the terminating radiating element 11a. That is, coupling amounts of the respective opening patterns 20b to 20d increase toward the terminating radiating element 11a.

As illustrated in FIG. 13, impedance matching elements 13b to 13d (hereinafter, may be referred to as an impedance matching element 13) corresponding to the respective opening patterns 20b to 20d are provided. Specifically, the impedance matching element 13b is provided so that signals cancel out signals that are reflected from the opening pattern 20b and return to the side of the controller 50. The impedance matching element 13c is provided so that signals cancel out signals that are reflected from the opening pattern 20c and return to the side of the controller 50. The impedance matching element 13d is provided so that signals cancel out signals that are reflected from the opening pattern 20d and return to the side of the controller 50.

That is, the impedance matching element 13 is provided on only one side of the opening pattern 20, specifically, the side of the controller 50. The respective impedance matching elements 13b to 13d have shapes corresponding to shapes of the opening pattern 20b to 20d.

Specifically, protrusions (or recesses) of the impedance matching elements 13b to 13d increase in size as the opening depths La and the opening widths Wa of the opening patterns 20b to 20d increase.

That is, as the opening depths La and the opening widths Wa of the opening patterns 20b to 20d increase, signals that are reflected and return to the side of the controller 50 increase. Therefore, the protrusions (recesses) of the impedance matching elements 13b to 13d are increased. As a result, it is certainly cancel out signals reflected from the respective opening patterns 20b to 20d.

For the terminating connector 12a, since the terminating radiating element 11a that functions as the matching element radiates all radio waves, it is not necessary to provide the opening pattern 20. For the base-end connector 12e, since an amount of electric power to be distributed is relatively small, a necessary amount of electric power can be ensured even when the opening pattern 20 is not formed. Thus, it is unnecessary to provide the opening pattern 20. For the base-end connector 12e, the opening pattern 20 may be provided as needed.

As illustrated in FIG. 14, by providing the connectors 12b to 12d corresponding to radiating elements 11b to 11d (numbers "2", "3" and "4" shown in FIG. 14) in the traveling-wave excitation-type antenna element 1 with the opening pattern 20b to 20d, respectively, it is possible to realize an ideal distribution of the coupling amount in a range of the coupling amount from 25% to 80%. That is, it is possible to realize a low side lobe of a vertical beam pattern in the traveling-wave excitation-type antenna element 1.

Figure 15:
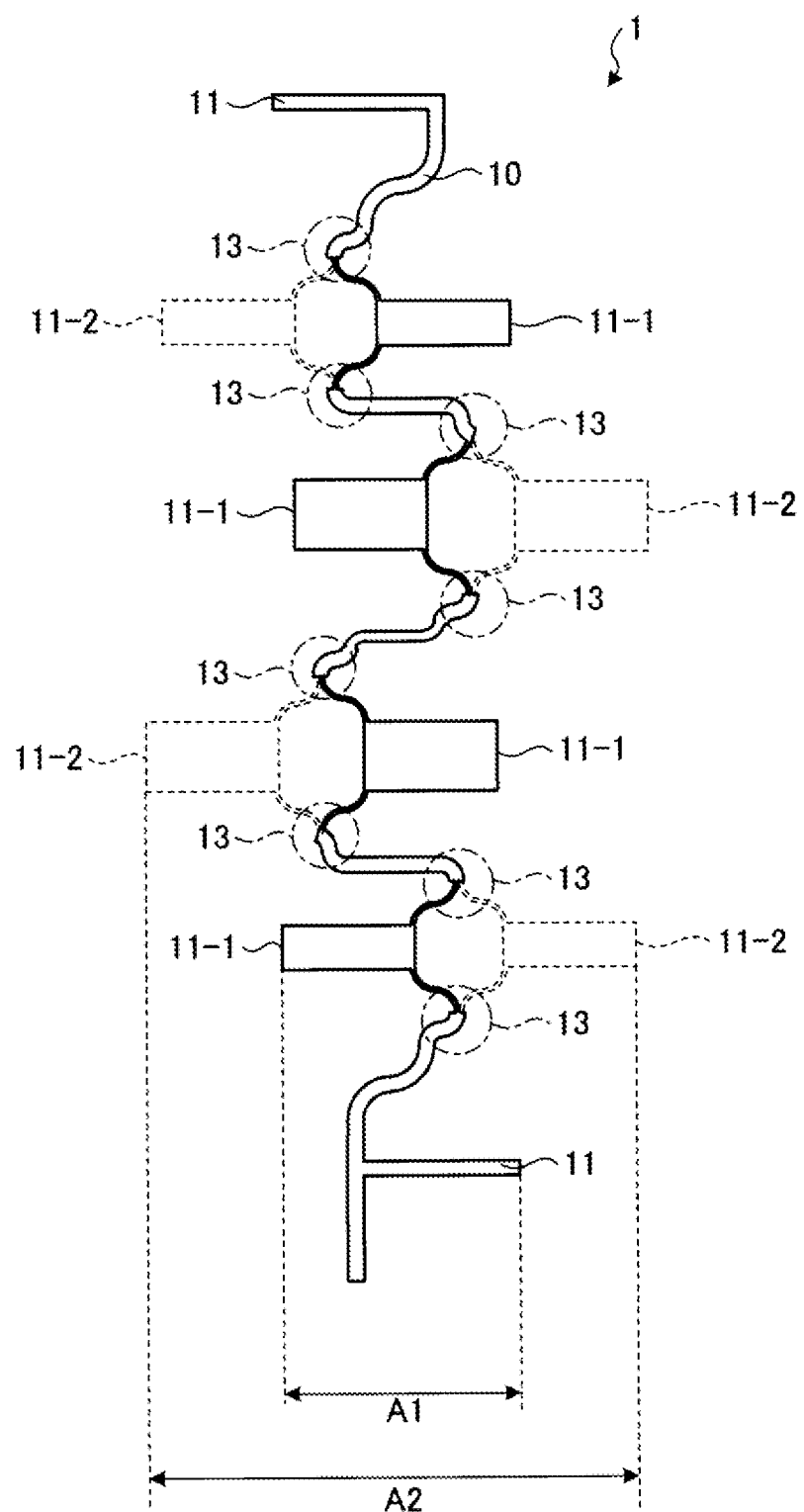
FIG. 15 is a diagram illustrating an antenna element according to a modification.

In the above, a case in which the feed line 10 has a linear shape is described, but for example, as illustrated in FIG. 15, the feed line 10 may have a curved shape.

FIG. 15 is a diagram illustrating an antenna element 1 according to a modification. FIG. 15 illustrates a standing-wave excitation-type antenna element 1. FIG. 15 also illustrates a so-called comb-line type antenna element 1 that has radiating elements 11-1 (or radiating elements 11-2) that protrude in both directions (hereinafter, may be referred to as a horizontal direction) with respect to an extending direction of the antenna element 1.

As illustrated in FIG. 15, in the comb-line type antenna element 1, there are two possible arrangements of radiating-elements 11 (radiating elements 11-1 drawn by a continuous line and radiating elements 11-2 drawn by a dashed line). First, the arrangement of the radiating elements 11-1 indicated by a continuous line will be described.

As illustrated in FIG. 15, a feed line 10 is bent together with impedance matching elements 13 between two radiating elements 11-1 adjacent to each other in the extending direction. Specifically, the feed line 10 has a curve in which an S shape is repeated so that a distance between the two adjacent radiating elements 11-1 is an integral multiple of 1 $\lambda$g. Thus, a length of the antenna element 1 in the extending direction can be shortened, so that an antenna apparatus 100 can be downsized.

In an example shown in FIG. 15, a case in which the feed line 10 has a curved shape is described, but the feed line 10 is not limited to the curved shape. For example, the feed line 10 may have a polygonal line shape, such as a zigzag shape.

Furthermore, as illustrated in FIG. 15, in a case of the standing-wave excitation-type antenna element 1, since the distance between the two adjacent radiating elements 11-1 can be increased to the "integral multiple" of 1 λg, opening patterns 20 in each of the radiating elements 11-1, and the impedance matching elements 13 on both sides of each of the radiating elements 11-1 can be provided. That is, a coupling amount of each of the radiating elements 11-1 can be easily adjusted.

In such a case, the impedance matching elements 13 may be provided so that a line width of the curved feed line 10 is partially discontinuous, or may be formed by connecting two curved feed lines 10 and curved impedance matching elements 13. The above effect obtained by bending the feed line 10 can be similarly obtained even by the arrangement of the radiating elements 11-2 indicated by the dashed line.

As illustrated in FIG. 15, each of the radiating elements 11-1 indicated by the continuous line is arranged so that adjacent radiating elements 11-1 are overlapped in the horizontal direction. As a result, since an aperture width A1 of the antenna element 1 can be reduced, a beam width of a horizontal beam pattern can be increased. Moreover, a distance between adjacent antenna elements 1 can be increased by reducing the aperture width A1, so that it is possible to prevent interference between the antenna elements 1.

As illustrated in FIG. 15, each of the radiating elements 11-2 indicated by the dashed line is arranged so that adjacent radiating elements 11-2 are not overlapped in the horizontal direction. As a result, since an aperture width A2 of the antenna element 1 can be increased, the beam width of the horizontal beam pattern be reduced.

As described above, the curve of the feed line 10 is combined with the arrangement of the radiating elements 11 so as to adjust the aperture widths A1 and A2, so that the beam Width of the horizontal beam pattern can be adjusted.

As illustrated in FIG. 15, three radiating elements 11 on a terminal end side and three radiating elements 11 on a base-end side are arranged to be point symmetrical. As a result, the horizontal beam pattern can bilaterally symmetrical.

It is possible for a person skilled in the art to easily come up with more effects and modifications, Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An antenna apparatus comprising:
a linear feed line; and
a radiating element that protrudes laterally from a first side of the feed line, wherein
the radiating element is formed by a conductive pattern, an opening pattern is located in a connector that connects the radiating element with the feed line, and the opening pattern extends in a direction in which the radiating element protrudes from the feed line.

2. The antenna apparatus according to claim 1, further comprising impedance matching elements that match an impedance of the radiating element, the impedance matching elements located a predetermined distance away from the radiating element having the opening pattern.

3. The antenna apparatus according to claim 2, wherein a plurality of the radiating elements is provided to the feed line at predetermined intervals, and the feed line is bent together with the impedance matching elements at a location that is between two of the radiating elements that are adjacent to each other.

4. The antenna apparatus according to claim 2, wherein a plurality of the radiating elements is provided to the feed line at predetermined intervals, and the impedance matching elements are provided at both sides of each of the radiating elements that are excited by standing waves formed in the feed line.

5. The antenna apparatus according to claim 1, wherein a plurality of the radiating elements is provided to the feed line at predetermined intervals, each of the radiating elements has an antenna pattern and a ground pattern as the conductive pattern, and the opening pattern is formed in at least one of the antenna pattern and the ground pattern.

6. The antenna apparatus according to claim 1, wherein the opening pattern is a notch which is formed in a second side of the feed line that is opposite the first side of the feed line, the notch extending in the direction in which the radiating element protrudes from the feed line.

7. The antenna apparatus according to claim 1, wherein a size of the opening pattern is selected based on a frequency of a supplied signal so that the size of the opening pattern is reduced as the frequency of the supplied signal is increased.

8. The antenna apparatus according to claim 1, wherein the opening pattern has a triangular shape.

9. The antenna apparatus according to claim 6, wherein the notch has a triangular shape.

10. The antenna apparatus according to claim 1, wherein the opening pattern is an aperture surrounded on all sides by the conductive pattern.

11. The antenna apparatus according to claim 1, wherein a plurality of the radiating elements is provided to the feed line at predetermined intervals, and
a width of each of the radiating elements located at ends of the feed line is less than a width of each of the radiating elements located between the radiating elements located at the ends of the feed line.

12. An antenna apparatus comprising:
a linear feed line; and
a plurality of radiating elements that are provided to the feed line at predetermined intervals and that protrude laterally from a first side of the feed line, wherein:
each of the radiating elements is formed by a conductive pattern, an opening pattern is located in each portion of the feed line from which one of the radiating elements protrudes, and the opening pattern extends into a portion of the corresponding radiating element;
the antenna apparatus further comprises impedance matching elements that match an impedance of the radiating elements, the impedance matching elements being located a predetermined distance away from the radiating elements having the opening pattern; and the impedance matching elements are provided at both sides of each of the radiating elements that are excited by standing waves formed in the feed line.

13. An antenna apparatus comprising:
a linear feed line; and
a radiating element that protrudes laterally from a first side of the feed line, wherein
the radiating element is formed by a conductive pattern, an opening pattern is located in a portion of the feed line from which the radiating element protrudes, and the opening pattern extends into a portion of the radiating element, and
a size of the opening pattern is selected based on a frequency of a supplied signal so that the size of the opening pattern is reduced as the frequency of the supplied signal is increased.

14. An antenna apparatus comprising:
a linear feed line; and
a plurality of radiating elements that are provided to the feed line at predetermined intervals and that protrude laterally from a first side of the feed line, wherein
each of the radiating elements is formed by a conductive pattern, an opening pattern is located in each portion of the feed line from which one of the radiating elements protrudes, and the opening pattern extends into a portion of the corresponding radiating element, and
a width of each of the radiating elements located at ends of the feed line is less than a width of each of the radiating elements located between the radiating elements located at the ends of the feed line.

* * * * *